(12) United States Patent
Leech et al.

(10) Patent No.: US 8,812,169 B2
(45) Date of Patent: Aug. 19, 2014

(54) HEAT SINK VERIFICATION

(75) Inventors: Phillip A. Leech, Houston, TX (US); Khaldoun Alzien, Houston, TX (US); William R. Jacobs, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 984 days.

(21) Appl. No.: 11/262,579

(22) Filed: Oct. 31, 2005

(65) Prior Publication Data

US 2007/0097620 A1    May 3, 2007

(51) Int. Cl.
| | |
|---|---|
| *G05D 23/00* | (2006.01) |
| *G01R 15/00* | (2006.01) |
| *H05K 7/20* | (2006.01) |
| *F28F 7/00* | (2006.01) |
| *F28D 7/02* | (2006.01) |
| *G06F 13/24* | (2006.01) |
| *G06F 15/00* | (2006.01) |
| *G06F 1/20* | (2006.01) |

(52) U.S. Cl.
CPC . *G06F 1/20* (2013.01); *G06F 1/206* (2013.01)
USPC ............. 700/300; 702/57; 361/688; 361/701; 165/80.2; 165/165; 710/260; 712/205; 713/2

(58) Field of Classification Search
USPC ............. 700/300; 702/57; 361/687, 690, 699, 361/709, 688; 165/80.2, 185; 29/890.03, 29/592.1; 713/1, 2; 710/260; 712/205
See application file for complete search history.

(56) References Cited

U.S. PATENT DOCUMENTS

| | | | | |
|---|---|---|---|---|
| 5,502,838 A * | 3/1996 | Kikinis | ......................... | 713/501 |
| 5,612,677 A * | 3/1997 | Baudry | ......................... | 340/584 |
| 6,058,012 A * | 5/2000 | Cooper et al. | ................ | 361/704 |
| 6,191,546 B1 * | 2/2001 | Bausch et al. | ................ | 318/471 |
| 6,205,547 B1 * | 3/2001 | Davis | ................ | 713/1 |
| 6,462,948 B1 | 10/2002 | Leija | | |
| 6,518,661 B1 | 2/2003 | Blish | | |
| 6,529,062 B2 | 3/2003 | Majumdar | | |
| 6,534,995 B1 * | 3/2003 | Schell et al. | ................... | 324/511 |
| 6,535,798 B1 * | 3/2003 | Bhatia et al. | ................... | 700/293 |
| 6,618,252 B2 | 9/2003 | Choi | | |
| 6,647,310 B1 * | 11/2003 | Yi et al. | ......................... | 700/121 |
| 6,647,332 B1 * | 11/2003 | Esterby et al. | .................. | 701/51 |
| 6,728,104 B1 | 4/2004 | Ahmad | | |
| 6,839,853 B2 * | 1/2005 | Odaohhara et al. | ........... | 713/300 |
| 6,893,902 B2 | 5/2005 | Cordes | | |
| 6,972,952 B2 * | 12/2005 | Lee | ......................... | 361/679.48 |
| 7,190,577 B2 * | 3/2007 | Ali | ................. | 361/687 |
| 7,313,709 B2 * | 12/2007 | Dang et al. | ..................... | 713/300 |
| 7,318,173 B1 * | 1/2008 | Falik et al. | ..................... | 714/36 |
| 2002/0101715 A1 * | 8/2002 | Osecky et al. | ................ | 361/687 |
| 2002/0143488 A1 * | 10/2002 | Cooper et al. | ................ | 702/132 |
| 2002/0172005 A1 * | 11/2002 | Ford et al. | ..................... | 361/687 |
| 2002/0196835 A1 * | 12/2002 | Schonath et al. | ................ | 374/45 |
| 2003/0063437 A1 * | 4/2003 | Kurihara | ....................... | 361/688 |
| 2003/0179033 A1 * | 9/2003 | Bienvenu et al. | ............. | 327/427 |
| 2004/0128101 A1 * | 7/2004 | Hermerding, II | ............. | 702/136 |

(Continued)

*Primary Examiner* — Kavita Padmanabhan
*Assistant Examiner* — Darrin Dunn (57) ABSTRACT

In one embodiment, a printed circuit board assembly comprises a printed circuit board including a processor, a heat sink mountable to the printed circuit board proximate the processor, and a memory module comprising logic instructions which, when executed by the processor, configure the processor to initiate a processor load routine, collect temperature gradient data during the processor load routine, and verify operation of the heat sink using the temperature gradient data.

28 Claims, 5 Drawing Sheets

(56) References Cited

U.S. PATENT DOCUMENTS

| | | | |
|---|---|---|---|
| 2004/0262409 A1* | 12/2004 | Crippen et al. | 236/49.3 |
| 2005/0049729 A1* | 3/2005 | Culbert et al. | 700/50 |
| 2005/0099172 A1* | 5/2005 | Durham et al. | 324/158.1 |
| 2005/0122691 A1 | 6/2005 | Crippen | |
| 2005/0217293 A1 | 10/2005 | Lee | |
| 2005/0240814 A1* | 10/2005 | Sasakura et al. | 714/14 |
| 2006/0005097 A1* | 1/2006 | Ichikawa et al. | 714/745 |
| 2006/0045168 A1* | 3/2006 | Socci et al. | 374/163 |
| 2006/0095911 A1* | 5/2006 | Uemura et al. | 718/100 |
| 2006/0117779 A1* | 6/2006 | Liebenow | 62/259.2 |
| 2006/0271335 A1* | 11/2006 | Schulke et al. | 702/183 |
| 2008/0066022 A1* | 3/2008 | Chandra | 716/4 |

\* cited by examiner

Fig. 7

HEAT SINK VERIFICATION

TECHNICAL FIELD

This application relates to electronic computing and more particularly to heat sink verification.

BACKGROUND

Computing devices such as personal computers (PCs) typically include one or more printed circuit boards (PCBs) on which various components are mounted to form printed circuit assemblies (PCAs). Such components include those that generate heat during their operation. One type of component that often generates large quantities of heat is a microchip, such as a microprocessor.

Due to the heat generated by some components, heat sinks are sometimes employed to remove heat from the components and transfer that heat to the ambient air that surrounds the components. For example, it is common to mount heat sinks to microprocessors to transfer heat generated by the microprocessors during their operation. In some cases, a manufacturing error that results in the absence of such a heat sink can cause operational errors to occur due to overheating of the component. Therefore, it may be important to ensure that a given heat sink is present.

Due to the importance of such heat sinks, it is useful to inspect a computing device to verify that the heat sink(s) of the device is/are present and are dissipating heat from heat sources that drive the computing device.

SUMMARY

In one embodiment, a printed circuit board assembly comprises a printed circuit board including a processor, a heat sink mountable to the printed circuit board proximate the processor, and a memory module comprising logic instructions which, when executed by the processor, configure the processor to initiate a processor load routine, collect temperature gradient data during the processor load routine, and verify operation of the heat sink using the temperature gradient data.

DETAILED DESCRIPTION

Disclosed are systems and methods for verifying operation of a heat sink, e.g., on a printed circuit board assembly, so that overheating of a heat-producing component of a computing device can be avoided. As is described in the following, the systems and methods may be embodied as logic instructions stored in a suitable memory module. When executed by a processor, the logic instructions cause the processor to initiate a processor load routine and to collect temperature gradient data during the load routine. The temperature gradient data may be compared to one or more thresholds to verify the operation of the heat sink. In alternate embodiments, the logic instructions may be embodied in an application specific integrated circuit (ASIC), as firmware on a configurable processor, or hardwired into logic in circuitry.

Figure 1:
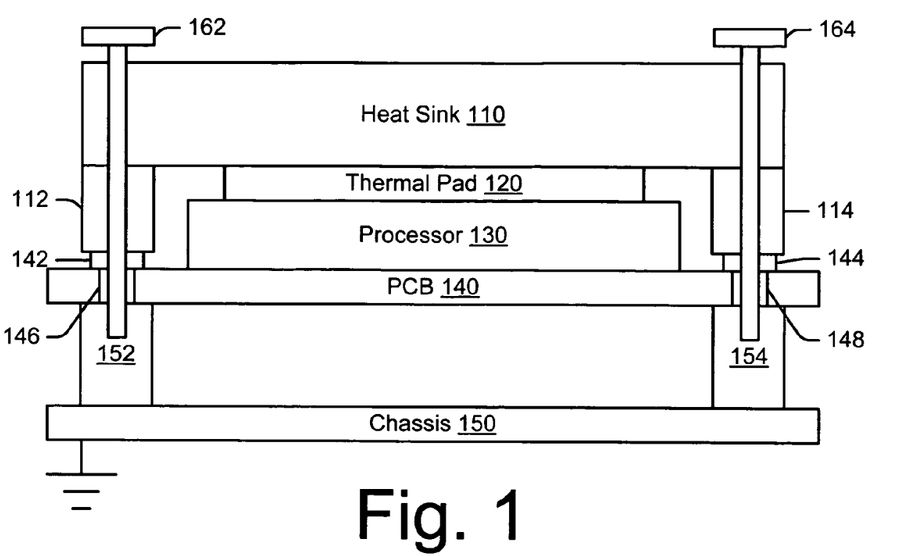
FIG. 1 is a schematic depiction of a circuit board assembly including a heat sink.

FIG. 1 is a schematic depiction of one embodiment of a circuit board assembly 100 including a heat sink. Referring to FIG. 1, circuit board assembly 100 comprises a printed circuit board (PCB) 140 mounted to an underlying chassis 150. Chassis 150 may include one or more mounting brackets 152, 154, also referred to as standoffs, to which the PCB 140 may be connected.

PCB 140 may include a plurality of components such as, e.g., processors, memory, etc., connected by circuit traces on the PCB 140. In one embodiment, PCB 140 may include a heat generating component such as processor 130 mounted to the surface of PCB 140.

Circuit board assembly 100 may further include a heat sink 110 mounted to the surface of PCB 140. In one embodiment, heat sink 110 may include supports 112, 114 which mount to the PCB 140 and support heat sink 110. Supports 112, 114 may be integrally formed with heat sink 110 or may be formed separately. Heat sink 110 is mounted to PCB in thermal communication with a heat-generating component such as processor 130 such that heat generated by processor 130 may be transferred from the processor 130 to the heat sink 110, which dissipates the heat. In one embodiment, a thermal pad 120 formed from a material that does not conduct electricity may be interposed between processor 130 and heat sink 110. In alternate embodiments, heat sink 110 may be in direct physical contact with processor 130, or heat sink 110 may be replaced by another cooling device.

In one embodiment, heat sink 110 may be mounted to PCB 140 using conventional fasteners such as, for example, screws 162, 164 that extend through an aperture in heat sink 110 and supports 112, 114. PCB 140 may include apertures 146, 148 (FIG. 2) to received screws 162, 164. Further, standoffs 152, 154 may include apertures to receive screws 162, 164. When the PCB assembly 100 is assembled, torque is applied to screws 162, 164, which applies a compressive force to heat sink 110, thermal pad 120, processor 130 and PCB 140, thereby securing the assembly 100.

In one embodiment, components of PCB assembly 100 are formed from materials that permit the components to function as elements of a heat sink detection system. In this regard, heat sink 110, supports 112, 114, standoffs 152, 154, chassis 150, and fasteners 162, 164 may include a material that conducts electricity such as, for example, aluminum, copper, or another suitable conductor. As illustrated in FIG. 1, chassis 150 may be connected to an electrical ground.

Figure 2:
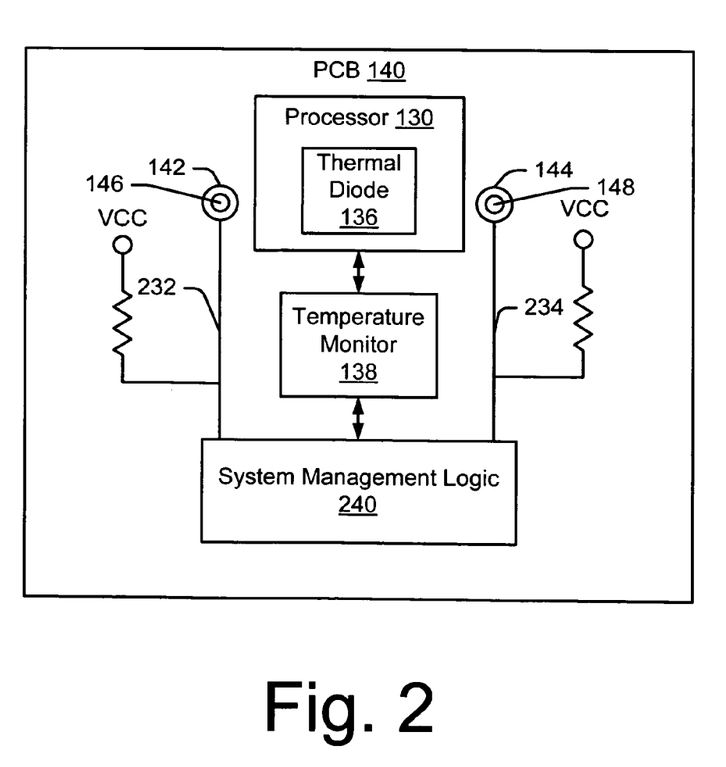
FIG. 2 is a schematic illustration of one embodiment of a printed circuit board adapted to verify a heat sink.

FIG. 2 is a schematic illustration of one embodiment of a printed circuit board 140. In one embodiment, PCB 140 comprises a processor 130. PCB 140 further comprises a first aperture 146 and a second aperture 148 proximate processor socket 220 to receive respective fasteners 162, 164. A first electrical contact 142 is positioned adjacent the first aperture 146, and a second electrical contact 144 is positioned adjacent the second aperture 148. In the embodiment depicted in FIG. 2, electrical contacts 142, 144 may be embodied as circuit traces that form annular rings circumscribing the respective apertures 146, 148. However, the particular shape of electrical contacts 142, 144 is not critical. In alternate embodiments, electrical contacts 142, 144 may be point contacts, or may circumscribe only a portion of apertures 146, 148. Further, although the embodiment depicted in FIG. 2 includes two separate electrical contacts, in alternate embodiments a single electrical contact adjacent one of the apertures 146, 148 may be used.

Electrical contact 142 is coupled to a source voltage (VCC) via circuit trace 232, which is, in turn, coupled to a system management logic module 240. Similarly, electrical contact 144 is coupled to a source voltage (VCC) via circuit trace 234, which is, in turn, coupled to system management logic module 240. In one embodiment, system management logic module 240 may be embodied as a combination of hardware and logic instruction that receive the voltage levels on traces 232, 234 as inputs. The particular source voltage level VCC is not critical.

In the absence of a heat sink, circuit traces 232, 234 will present a voltage level corresponding to VCC as inputs to system management logic 240. However, when a heat sink assembly as depicted in FIG. 1 is mounted to PCB 140, electrical path from circuit traces 232, 234 to ground is established via contacts 142, 144, supports 112, 114, fasteners 162, 164, standoffs 152, 154, and chassis 150. Hence, securing the heat sink to the PCB 140 causes the voltage at circuit traces to drop to ground. System management logic 240 detects the voltage drop on circuit traces 232, 234.

In one embodiment, PCB 140 may comprise a thermal diode 136 or any other temperature detecting device, which may be reside on processor 130 or may be an adjunct component. Thermal diode 136 generates an electrical signal indicative of a temperature proximate the processor 130. Thermal diode 136 forwards the signal to a temperature monitor 138 on PCB 140. Temperature monitor 138 may be embodied as any device that can process the signal from thermal diode 136 such as, e.g., an A/D converter or a thermal diode interface. Temperature monitor 138 generates a signal that is directed to system management logic 240.

Figure 3:
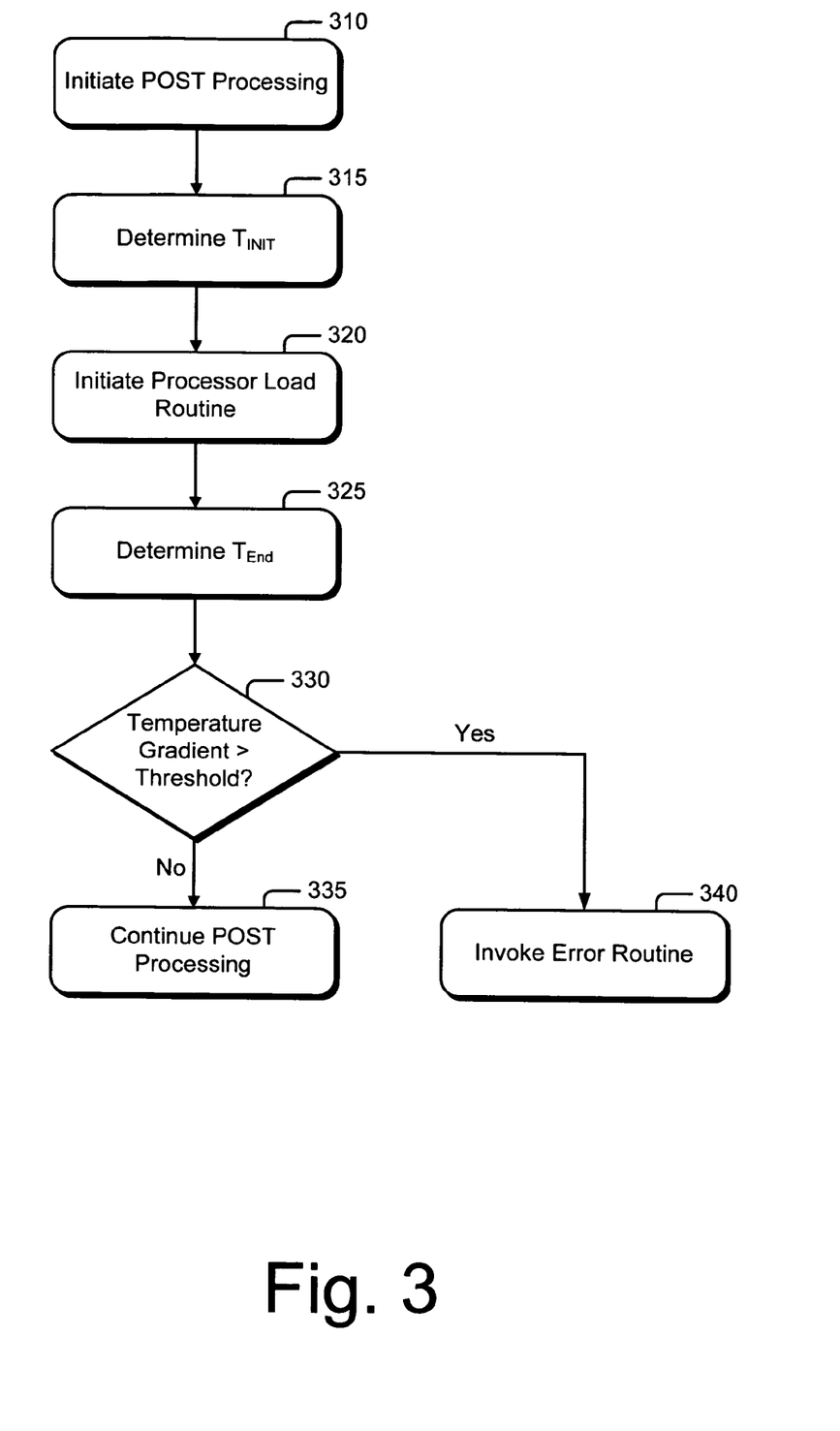
FIG. 3 is a flowchart illustrating operations in one embodiment of a method of operating a computing system.

System management logic 240 may include logic instructions executable on a processor to verify the operations of a heat sink such as heat sink 110. In one embodiment, the logic instructions may be incorporated into the basic input/output system (BIOS) of a computing device. FIG. 3 is a flowchart illustrating operations in one embodiment of a heat sink verification routine which may be used to verify the operation of a heat sink 110 on a printed circuit board assembly such as, e.g., assembly 100 in a computing system.

Referring to FIG. 3, at operation 310, the system BIOS initiates power on self test (POST) processing. At operation 315 an initial temperature is determined in a region proximate the processor. In one embodiment, PCB 140 may include thermal diode 136 and temperature monitor 138 to detect a temperature. In an alternate embodiment, an ambient temperature measurement from, e.g., the operating environment, may be used as an initial temperature measurement.

At operation 320 the BIOS initiates a processor load routine. In one embodiment, a processor load routine may be implemented as a series of calculations that consumes significant processor resources. For example, a processor load routine may be implemented as an infinite loop that increments a counter, or a loop that increments until the counter hits a large number (e.g., 1,000,000). In one embodiment the load routine may continue for a predetermined period of time, e.g., five to ten seconds. The particular operations conducted during the processor load routine are not important. Alternate implementations of a load routine may include any other processor-intensive operation(s) such as, e.g., mathematical computations.

At operation 325 an end temperature is detected, e.g., using thermocouple, a thermistor or other temperature detecting circuitry proximate the processor 140. In one embodiment, temperature gradient data is determined, e.g., by calculating the change in temperature ($T_{INIT}-T_{END}$) divided by the duration of the time that elapsed between taking $T_{INIT}$ and $T_{END}$.

In alternate embodiments temperature data may be collected at multiple points in time during the processor load operation, and temperature gradient data may be determined over multiple points in time.

If, at operation 330 the temperature gradient data fails to exceed a threshold, then control passes to operation 335 and POST processing may continue normally. By contrast, if at operation 330 the temperature gradient data exceeds a threshold, then control passes to operation 340 and an error routine is invoked. In one embodiment, the error routine may include generating an error signal. In response to the error signal, the BIOS may suspend processor operations, including POST processing operations. In addition, or in the alternative, the BIOS may generate an error message that may include an audible or visible alert that may be presented to a user via a suitable user interface.

In one embodiment, the temperature gradient threshold may be determined by empirical testing of a computing system. For example, a manufacturer or distributor of a computing system or of a PCB assembly implement a test process in which the computing system is operated in a first state in which the heat sink is connected and functional and a second state in which the heat sink is either disconnected or otherwise not functioning. Temperature gradient data may be collected in both the first operating state and/or the second operating state, and may be used to define one or more temperature gradient thresholds.

Figure 4:
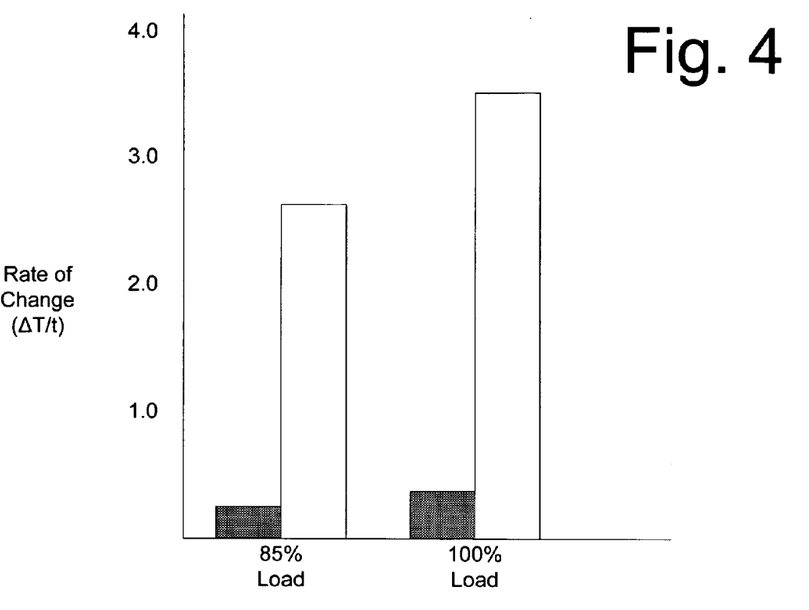
FIGS. 4-6 are graphs illustrating temperature gradient changes.

FIG. 4 is a graph illustrating temperature gradient changes during the first five seconds of operation of a processor in a first state in which a heat sink is attached to the processor and is active, and a second state in which the heat sink is missing. The temperature gradient in the first state is indicated by a shaded area, while the temperature gradient in the second state is indicated by an unshaded area. Referring to FIG. 4, at an 85% load the temperature gradient of a processor operating in the first state is approximately 0.25 degrees C. per second, while the temperature gradient of a processor operating in the second state is approximately 2.6 degrees C. per second. At a 100% load the temperature gradient of a processor operating in the first state is approximately 0.3 degrees C. per second, while the temperature gradient of a processor operating in the second state is approximately 3.5 degrees C. per second.

Figure 5:
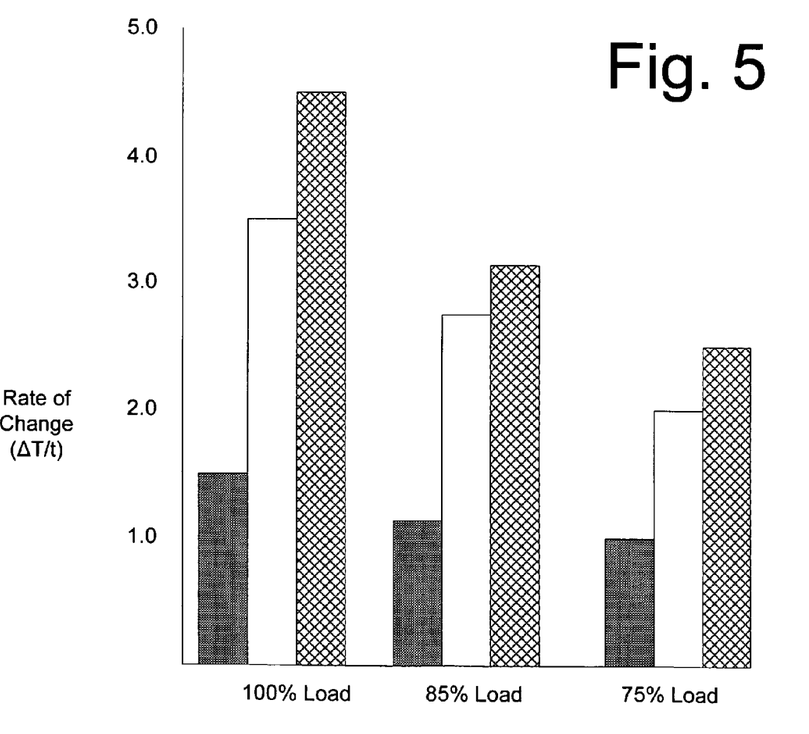
Figure 6:
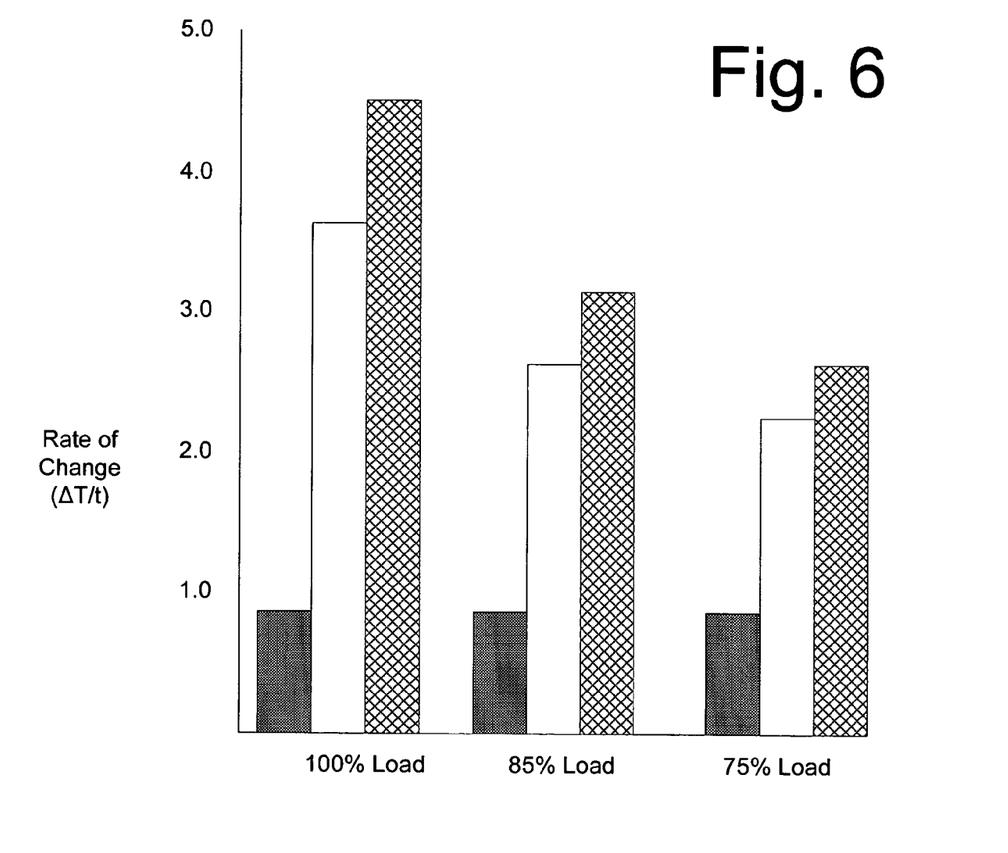

FIGS. 5-6 are graphs illustrating temperature gradient changes during the first five seconds of operation of a processor in a first state in which a heat sink is attached to the processor and is active, and a second state in which the heat sink is attached, but is not functional, and a third state in which the heat sink is missing. The temperature gradient in the first state is indicated by a shaded area, the temperature gradient in the second state is indicated by an unshaded area, and the temperature gradient in the second state is indicated by a cross-hatched area.

The measurements in FIG. 5 were taken at an ambient temperature of approximately seven degrees Celsius (7 C). Referring to FIG. 5, at a 100% load the temperature gradient of a processor operating in the first state is approximately 1.5 degrees C. per second, while the temperature gradient of a processor operating in the second state is approximately 3.5 degrees C. per second and the temperature gradient of a processor operating in the third state is approximately 4.5 degrees C. per second. At 85% load the temperature gradient of a processor operating in the first state is approximately 1.2 degrees C. per second, while the temperature gradient of a processor operating in the second state is approximately 2.7 degrees C. per second and the temperature gradient of a processor operating in the third state is approximately 3.2 degrees C. per second. At 75% load the temperature gradient of a processor operating in the first state is approximately 1.0 degrees C. per second, while the temperature gradient of a processor operating in the second state is approximately 2.0 degrees C. per second and the temperature gradient of a processor operating in the third state is approximately 2.5 degrees C. per second.

The measurements in FIG. 6 were taken at an ambient temperature of approximately thirty-five degrees Celsius (35 C). Referring to FIG. 6, at a 100% load the temperature gradient of a processor operating in the first state is approximately 0.8 degrees C. per second, while the temperature gradient of a processor operating in the second state is approximately 3.2 degrees C. per second and the temperature gradient of a processor operating in the third state is approximately 4.5 degrees C. per second. At 85% load the temperature gradient of a processor operating in the first state is approximately 0.8 degrees C. per second, while the temperature gradient of a processor operating in the second state is approximately 2.7 degrees C. per second and the temperature gradient of a processor operating in the third state is approximately 3.2 degrees C. per second. At 75% load the temperature gradient of a processor operating in the first state is approximately 0.8 degrees C. per second, while the temperature gradient of a processor operating in the second state is approximately 2.2 degrees C. per second and the temperature gradient of a processor operating in the third state is approximately 2.6 degrees C. per second.

FIGS. 4-6 illustrate that there is a measurable difference in the temperature gradient data between processors in which the heat sink is properly secured and functional, and processors in which the heat sink is not functioning properly. This difference may be used to set a temperature gradient threshold which may be used, e.g., in operation 330 to verify a heat sink. For example, referring to FIGS. 5-6, in one embodiment a temperature gradient threshold of 2.0 may be used to distinguish between a heat sink that is functioning properly and a heat sink that is not functioning properly, or is missing.

In one embodiment the threshold may be static. In alternate embodiments a threshold may be determined dynamically as a function of the initial ambient temperature, the processor load, and/or other factors. For example, temperature gradient data may be collected at a plurality of combinations of ambient temperature and processor loads. The temperature gradient data may be stored in a suitable memory location such as, e.g., a data table in a memory module. Temperature gradient thresholds may then be set as a function of $T_{INIT}$ and the processor load.

Figure 7:
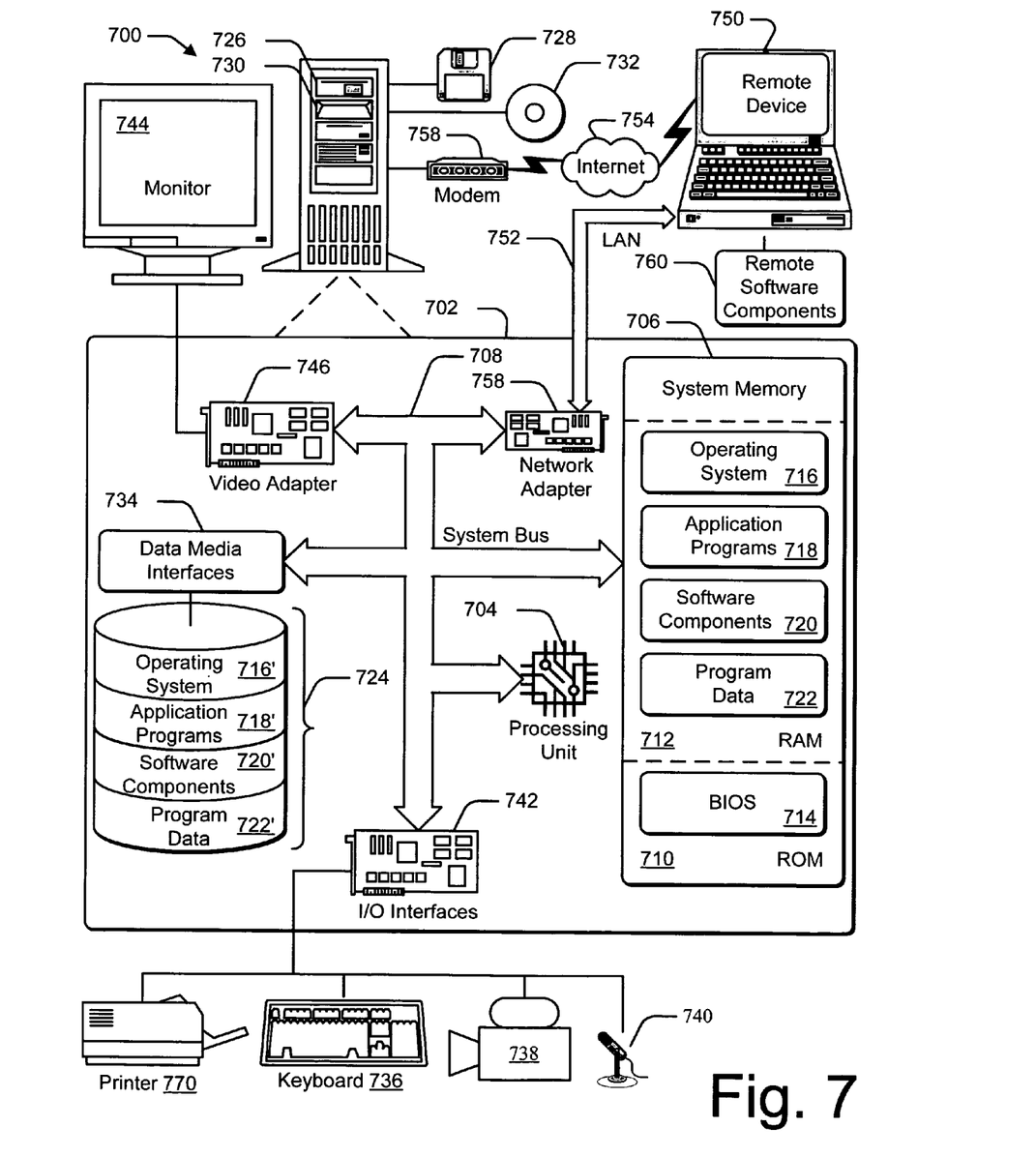
FIG. 7 is a schematic illustration of a computing environment in accordance with an embodiment.

In one embodiment, the PCB assembly 100 depicted in FIGS. 1-2 and the logic operations depicted in FIG. 3 may be incorporated into a computing system. FIG. 7 shows components of typical example of such a computer, referred by to reference numeral 700. The components shown in FIG. 7 are only examples, and are not intended to suggest any limitation as to the scope of the functionality of the invention; the invention is not necessarily dependent on the features shown in FIG. 7.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, mini-computers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD. From there, they are installed or loaded into the secondary memory of a computer. At execution, they are loaded at least partially into the computer's primary electronic memory. The invention described herein includes these and other various types of computer-readable media when such media contain instructions, programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 7, the components of computer 700 may include, but are not limited to, a processing unit 704, a system memory 706, and a system bus 708 that couples various system components including the system memory 706 to the processing unit 704. The system bus 708 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Computer 700 typically includes a variety of computer-readable media. Computer-readable media can be any available media that can be accessed by computer 700 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 700. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network, fiber optic networks, or direct-wired connection and wireless media such as acoustic, RF, infrared and other wireless media. Combinations of any of the above should also be included within the scope of computer readable media The system memory 706 includes computer storage media in the form of volatile and/or nonvolatile memory such as read only memory (ROM) 710 and random access memory (RAM) 712. A basic input/output system 714 (BIOS), containing the basic routines that help to transfer information between elements within computer 700, such as during start-up, is typically stored in ROM 710. RAM 712 typically contains data and/or program modules that are immediately accessible to and/or presently being operated on by processing unit 704. By way of example, and not limitation, FIG. 7 illustrates operating system 716, application programs 718, other software components 720, and program data 722.

The computer 700 may also include other removable/non-removable, volatile/nonvolatile computer storage media. By way of example only, the computer system of FIG. 7 may include a hard disk drive 724 that reads from or writes to non-removable, nonvolatile magnetic media, a magnetic disk drive 726 that reads from or writes to a removable, nonvolatile magnetic disk 728, and an optical disk drive 730 that reads from or writes to a removable, nonvolatile optical disk 732 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 724 is typically connected to the system bus 708 through a non-removable memory interface such as data media interface 734, and magnetic disk drive 726 and optical disk drive 730 are typically connected to the system bus 708 by a removable memory interface.

The drives and their associated computer storage media discussed above and illustrated in FIG. 7 provide storage of computer-readable instructions, data structures, program modules, and other data for computer 700. In FIG. 7, for example, hard disk drive 724 is illustrated as storing operating system 716', application programs 718', software components 720', and program data 722'. Note that these components can either be the same as or different from operating system 716, application programs 718, software components 720, and program data 722. Operating system 716, application programs 718, other program modules 720, and program data 722 are given different numbers here to illustrate that, at a minimum, they are different copies. A user may enter commands and information into the computer 700 through input devices such as a keyboard 736 and pointing device 738, commonly referred to as a mouse, trackball, or touch pad. Other input devices (not shown) may include a microphone 740, joystick, game pad, satellite dish, scanner, or the like. These and other input devices are often connected to the processing unit 704 through an input/output (I/O) interface 742 that is coupled to the system bus, but may be connected by other interface and bus structures, such as a parallel port, game port, or a universal serial bus (USB). A monitor 744 or other type of display device is also connected to the system bus 706 via an interface, such as a video adapter 746. In addition to the monitor 744, computers may also include other peripheral output devices (e.g., speakers) and one or more printers 770, which may be connected through the I/O interface 742.

The computer may operate in a networked environment using logical connections to one or more remote computers, such as a remote computing device 750. The remote computing device 750 may be a personal computer, a server, a router, a network PC, a peer device or other common network node, and typically includes many or all of the elements described above relative to computer 700. The logical connections depicted in FIG. 7 include a local area network (LAN) 752 and a wide area network (WAN) 754. Although the WAN 754 shown in FIG. 7 is the Internet, the WAN 754 may also include other networks. Such networking environments are commonplace in offices, enterprise-wide computer networks, intranets, and the like.

When used in a LAN networking environment, the computer 700 is connected to the LAN 752 through a network interface or adapter 756. When used in a WAN networking environment, the computer 700 typically includes a modem 758 or other means for establishing communications over the Internet 754. The modem 758, which may be internal or external, may be connected to the system bus 706 via the I/O interface 742, or other appropriate mechanism. In a networked environment, program modules depicted relative to the computer 700, or portions thereof, may be stored in the remote computing device 750. By way of example, and not limitation, FIG. 7 illustrates remote application programs 760 as residing on remote computing device 750. It will be appreciated that the network connections shown are exemplary and other means of establishing a communications link between the computers may be used.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least one implementation. The appearances of the phrase "in one embodiment" in various places in the specification are not necessarily all referring to the same embodiment.

What is claimed is:

1. A printed circuit board assembly, comprising:
   a printed circuit board including a processor;
   a heat sink mountable to the printed circuit board proximate the processor; and a system management logic module comprising logic
  instructions stored in a computer readable medium
  which, when executed by the processor, configure the
  processor to:
initiate POST processing operations, and during the POST
  processing operations:
  determine an initial temperature ($T_{INIT}$) in a region
    proximate the processor;
  initiate by a BIOS, a processor load routine to generate
    heat;
  detect an end temperature ($T_{End}$) in the region proximate
    the processor;
  obtain temperature gradient data ($T_{INIT}$-$T_{END}$) of heat
    generated in a region proximate the processor during
    the processor load routine;
  verify operation of the heat sink using the temperature
    gradient data; and
  continue by the BIOS, the POST processing operations
    when the temperature gradient data fails to exceed a
    threshold; and
  invoke an error routine when the temperature gradient data
    exceeds the threshold, the error routine suspending pro-
    cessor operations including the POST processing opera-
    tions.

2. The printed circuit board assembly of claim 1, the system management logic module further comprising logic instructions which, when executed by the processor, configure the processor to:
  determine a temperature proximate the processor at a first point in time;
  initiate a series of calculations that consumes significant processor resources;
  determine a temperature proximate the processor at a second point in time; and
  determine a rate of temperature change over time.

3. The printed circuit board assembly of claim 2, the system management logic further comprising logic instructions which, when executed by the processor, configure the processor to generate an error signal when the rate of temperature change over time exceeds the threshold.

4. The printed circuit board assembly of claim 1, wherein the printed circuit board further comprises:
  a first aperture to receive a first fastener coupled to the heat sink;
  a first electrical contact proximate the first aperture and coupled to a source voltage;
  a first circuit trace coupled to a ground voltage and first electrical contact and providing an input to the system management logic module, whereby securing the heat sink to the printed circuit board causes the voltage at the first circuit trace to drop from a supply voltage to a ground voltage.

5. The printed circuit board assembly of claim 4, wherein the system management logic module detects a voltage drop on the first circuit trace when the heat sink is secured to the circuit board.

6. The printed circuit board assembly of claim 1, the system management logic module further comprising logic instructions which, when executed by the processor, configure the processor to:
  compare a temperature proximate the processor to temperature gradient data, the temperature gradient data collected during a test process wherein the printed circuit board assembly is operated in a first state in which the heat sink is connected and functional, and a second state in which the heat sink is either disconnected and not functioning.

7. The printed circuit board assembly of claim 6, wherein there is a measurable difference in the temperature gradient data between processors in which the heat sink is properly secured and functional, and processors in which the heat sink is not functioning.

8. The printed circuit board assembly of claim 1, wherein the threshold is determined dynamically as a function of initial ambient temperature and processor load.

9. A computing system, comprising:
  a printed circuit board including a processor;
  a heat sink mountable to the printed circuit board proximate the processor; and
  a system management logic module comprising logic
    instructions stored in a computer readable medium
    which, when executed by the processor, configure the
    processor to:
  initiate POST processing operations, and during POST
    processing operations:
  determine an initial temperature ($T_{INIT}$);
    initiate a processor load routine to generate heat;
    detect an end temperature ($T_{End}$);
    obtain temperature gradient data ($T_{INIT}$-$T_{END}$) of heat
      generated during the processor load routine in a
      region proximate the processor; and
    verify operation of the heat sink using the temperature
      gradient data.

10. The computing system of claim 9, the system management logic module further comprising logic instructions which, when executed by the processor, configure the processor to:
  determine a temperature proximate the processor at a first point in time;
  initiate a series of calculations that consumes significant processor resources;
  determine a temperature proximate the processor at a second point in time; and
  determine a rate of temperature change over time.

11. The computing system of claim 10, the system management logic module further comprising logic instructions which, when executed by the processor, configure the processor to generate an error signal when the rate of temperature change over time exceeds a threshold.

12. The computing system of claim 9, wherein the printed circuit board further comprises:
  a first aperture to receive a first fastener coupled to the heat sink;
  a first electrical contact proximate the first aperture and coupled to a source voltage;
  a first circuit trace coupled to a ground voltage and first electrical contact and providing an input to the system management logic module, whereby securing the heat sink to the printed circuit board causes the voltage at the first circuit trace to drop from a supply voltage to a ground voltage.

13. The computing system of claim 12, wherein the system management logic module detects a voltage drop on the first circuit trace when the heat sink is secured to the circuit board.

14. A method to verify operation of a heat sink proximate a processor on a printed circuit board assembly, comprising:
  initiating POST processing operations, and during the POST processing operations:
  determining an initial temperature ($T_{INIT}$) in a region proximate the processor;
  initiating by a BIOS, a load routine on the processor during POST processing operations, the load routine including processor-intensive operations executed only to generate heat;

detecting an end temperature ($T_{End}$) in the region proximate the processor;

obtaining temperature gradient data ($T_{INIT}$-$T_{END}$) in a region proximate the processor during the load routine during the POST processing operations;

using the temperature gradient data to verify the operation of the heat sink during the POST processing operations;

continue by the BIOS, the POST processing operations when the temperature gradient data fails to exceed a threshold.

15. The method of claim 14, further comprising:

determining a temperature proximate the processor at a first point in time;

initiating a series of calculations that consumes significant processor resources;

determining a temperature proximate the processor at a second point in time; and determining a rate of temperature change over time.

16. The method of claim 15, further comprising generating an error signal when the rate of temperature change over time exceeds a threshold.

17. The method of claim 16, further comprising suspending processor operations in response to the error signal.

18. The method of claim 16, further comprising generating an error message in response to the error signal.

19. A computer program product, comprising logic instructions stored on a non-transitory computer-readable storage medium which, when executed by a processor, configure the processor to:

initiate POST processing operations, and during the POST processing operations:

determine an initial temperature ($T_{INIT}$) in a region proximate the processor;

initiate by a BIOS, a processor load routine executed for a predetermined time to generate heat during POST processing operations, wherein the processor load routine is a series of calculations designed to consume significant processor resources and;

detect an end temperature ($T_{End}$) in the region proximate the processor;

obtain temperature gradient data ($T_{INIT}$-$T_{END}$) in a region proximate the processor during the processor load routine;

verify operation of a heat sink during POST processing operations using the temperature gradient data; and continue by the BIOS, the POST processing operations when the temperature gradient data fails to exceed a threshold.

20. The computer program product of claim 19, further comprising logic instructions which, when executed by the processor, configure the processor to:

determine a temperature proximate the processor at a first point in time;

initiate a series of calculations that consumes significant processor resources;

determine a temperature proximate the processor at a second point in time; and determine a rate of temperature change over time.

21. The computer program product of claim 20, further comprising logic instructions which, when executed by the processor, configure the processor to generate an error signal when the rate of temperature change over time exceeds a threshold.

22. The computer program product of claim 21, further comprising logic instructions which, when executed by the processor, configure the processor to suspend operations in response to the error signal.

23. The computer program product of claim 21, further comprising logic instructions which, when executed by the processor, configure the processor to generate an error message in response to the error signal.

24. A device, comprising:

a heat generating component;

a cooling device proximate the heat generating component;

a system management logic module comprising logic instructions stored in a computer readable medium which, when executed by a processor, configure the processor to:

initiate POST processing operations, and during the POST processing operations:

determine an initial temperature ($T_{INIT}$) in a region proximate the processor;

initiate a load routine to generate heat by the heat generating component;

detect an end temperature ($T_{End}$) in the region proximate the processor;

obtain temperature gradient data ($T_{INIT}$-$T_{END}$) in a region proximate the heat generating component during the load routine;

use the temperature gradient data to verify the operation of the cooling device;

continue the POST processing operations when the temperature gradient data fails to exceed a threshold; and invoke an error routine when the temperature gradient data exceeds the threshold, the error routine suspending processor operations including the POST processing operations.

25. The device of claim 24, further comprising logic to:

determine a temperature proximate the heat generating component at a first point in time;

initiate a series of calculations that consumes significant processing resources in the heat generating component;

determine a temperature proximate the heat generating component at a second point in time; and determine a rate of temperature change over time.

26. The device of claim 25, further comprising logic to generate an error signal when the rate of temperature change over time exceeds a threshold.

27. The device of claim 24, further comprising a printed circuit board, and wherein the printed circuit board further comprises:

a first aperture to receive a first fastener coupled to the cooling device;

a first electrical contact proximate the first aperture and coupled to a source voltage;

a first circuit trace coupled to a ground voltage and first electrical contact and providing an input to a system management logic module, whereby securing the cooling device to the printed circuit board causes the voltage at the first circuit trace to drop from a supply voltage to a ground voltage.

28. The device of claim 27, wherein the system management logic module detects a voltage drop on the first circuit trace when the heat sink is secured to the circuit board.

* * * * *